(12) United States Patent
Musk et al.

(10) Patent No.: US 6,185,194 B1
(45) Date of Patent: Feb. 6, 2001

(54) SYSTEM AND METHOD FOR INITIATING A TELEPHONE CALL UTILIZING INTERNET INITIATION

(75) Inventors: Elon Musk, Mountain View; Aleksandar Dukic, Sunnyvale, both of CA (US)

(73) Assignee: Zip2, Mountain View, CA (US)

( * ) Notice: Under 35 U.S.C. 154(b), the term of this patent shall be extended for 0 days.

(21) Appl. No.: 08/989,844

(22) Filed: Dec. 12, 1997

(51) Int. Cl.[7] .............................. H04L 12/16; H04Q 11/00
(52) U.S. Cl. ............................ 370/260; 370/352; 379/202
(58) Field of Search .............................. 370/259, 260–263, 370/351, 352–356; 379/201, 202–206; 455/414, 415, 416, 417

(56) References Cited

U.S. PATENT DOCUMENTS 5,867,495 * 2/1999 Elliott et al. ......................... 370/352
6,026,087 * 2/2000 Mirashrafi et al. .................. 370/389

FOREIGN PATENT DOCUMENTS

WO 97/22210 * 6/1997 (WO).
WO 97/22211 * 6/1997 (WO).

OTHER PUBLICATIONS

Apr. 3, 1997 printout of web site: http://www.sprint.com/web-to-phone/.
Apr. 3, 1997 printout of web site: http://www.sprint.com/web-to-phone/demo.html.
Apr. 3, 1997 printout of web site: http://www.sprint.com/web-to-phone/more.html.
Apr. 3, 1997 printout of web site: http://www.sprint.com/web-to-phone/apps.html.

* cited by examiner

*Primary Examiner*—Ajit Patel
(74) *Attorney, Agent, or Firm*—Townsend and Townsend and Crew LLP

(57) ABSTRACT

A system and method for uniquely combining the best aspects of the Internet and the Public Switched Telephone Network for calling an entity displayed on a monitor. A user provides an input to the computer to initiate a call. The call request data is received at a Web site providing the display, and is relayed over the Internet to a call center. The call center establishes the desired phone connection over the Public Switched Telephone Network.

29 Claims, 4 Drawing Sheets

SYSTEM AND METHOD FOR INITIATING A TELEPHONE CALL UTILIZING INTERNET INITIATION

BACKGROUND OF THE INVENTION

The present invention relates generally to initiating telephone calls and more particularly to using the Internet to initiate a telephone call.

Traditionally, the telephone has been the fastest and most convenient means of communicating information from one destination to another. A user can simply pick up the telephone, dial a telephone number, and connect to a particular individual. With the increasing use of personal computers, many users are now utilizing their telephones in conjunction with their personal computers to further enhance the speed, convenience, and functionality that telephones already provide. Accordingly, there are many computer systems that contain software programs to initiate a telephone call from a personal computer. For example, one software program allows a user to access a Rolodex directory of names from a personal computer to select and place a telephone call to a particular entity. The personal computer software initiates the telephone call when the user clicks on a phone number to call. Once the telephone begins dialing, the user must pick up the telephone to speak to the entity called.

The Internet provides users with another means of communicating information, ideas, and messages. The Internet is a global network which allows users to access information through the use of a Web browser. The Web browser accesses a particular Web server through the Internet link.

By connecting to the Internet, the user can then retrieve a multitude of Web sites. A Web site is a series of screen displays (Web pages) consisting of text, pictorial, and other information about a particular subject, organization, or company. A particular Web site can be retrieved from the Internet by specifying its Web site address to the Web browser.

It has been recognized that sound, and thus telephone calls, can be encoded and transmitted over the Internet, and hardware and software have been developed for this. The user maintains a direct connection to the called party through the Internet link without ever using a telephone line. One disadvantage of the direct connection through the Internet is that there may a time delay in voice transmission and the voice sometimes becomes distorted and unclear.

Whatever method is used for placing calls, the telephone number often may be first found in a phone directory. More recently, a user can access a Web site having an Internet directory, such as the Zip2 Web site, to view different businesses.

SUMMARY OF THE INVENTION

The present invention uniquely combines the best aspects of the Internet and the Public Switched Telephone Network ("PSTN") for calling an entity displayed on a monitor. A user provides an input to the computer to initiate a call. The call request data is received at a Web site providing the display, and is relayed over the Internet to a call center. The call center establishes the desired phone connection over the PSTN.

The call center can establish the call, even though it is not at either end of the desired call, by using a conference call feature. By establishing call centers in different geographic locations, the cost of calls can be reduced by choosing a call center in a time zone with the lowest rates available for the particular connection desired.

Preferably, the Web site accessed to place the call has a business directory, with a phone icon for a business to allow call initiation. The Web site will also contain billing information such as business address, contact person, and telephone number. The business directory typically already provides reverse billing for the listing, and thus can be used like an 800 service, to bill the business for the telephone call instead of the user.

Additionally, the business directory preferably has an associated map database to provide directions to a business. The map database has longitude and latitude coordinates which can be used, in combination with a calling rates database to determine the location of a call center with the lowest calling rate available for the particular call. The unique combination of a business database, a map database, and a calling rates database makes this viable.

Advantages of the invention include combining a business directory with a map directory to provide a connection to a call center. Further, the invention provides the user with a call center having the lowest calling rate available. Additionally, a call center to establish the desired phone connection over the PSTN is provided.

A further understanding of the nature and advantages of the inventions herein may be realized by reference to the remaining portions of the specification and the attached drawings.

DETAILED DESCRIPTION OF SPECIFIC EMBODIMENTS

In the description that follows, the present invention will be described in reference to a preferred embodiment that operates on the Internet. In particular, examples will be described which illustrate particular applications of the invention on the Internet. The present invention, however, is not limited to any particular information source or network nor limited by the examples described herein. Therefore, the description of the embodiments that follow are for purposes of illustration and not limitation.

Figure 1:
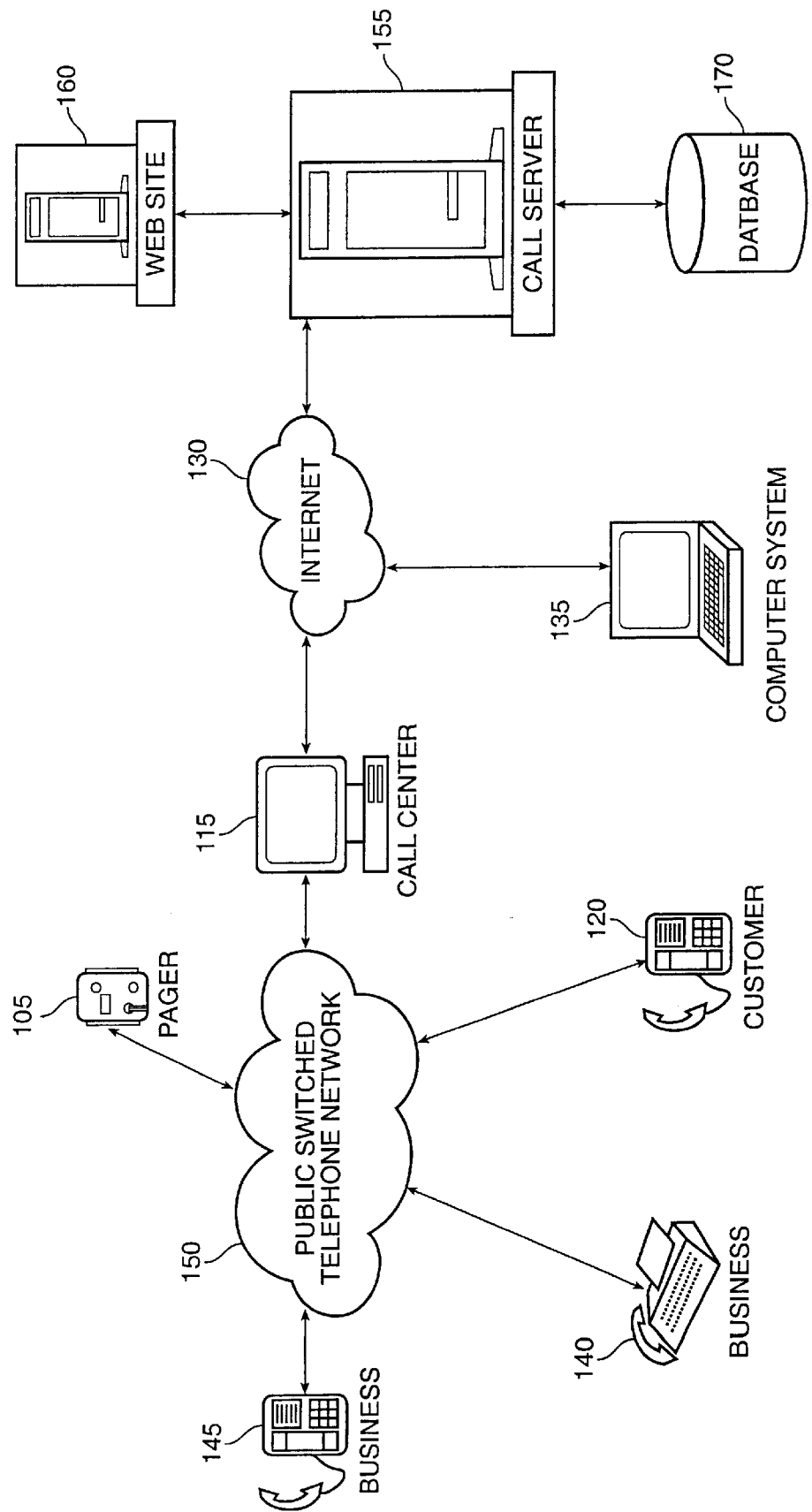
FIG. 1 illustrates a telephone call generator networked over the Internet which is used to execute the software of an embodiment of the present invention.

FIG. 1 illustrates a system according to an embodiment of the present invention. A user connects to the Internet 130 via a Web browser, such as Netscape and Microsoft Internet Explorer, running on a computer system 135. Computer system 135 can be a computer, a television set, a terminal, or any other device used to access the Internet 130.

Once a connection to the Internet 130 has been established, a user can access a particular Web site 160, such as the Zip2 Web site, through the Web browser. A Web site is a series of screen displays (Web pages) consisting of text, pictorial, and other information about a particular subject, organization, or company. The Web site 160 accesses information from a particular Web server or call server 155. In one embodiment, the Web site 160 runs a call client software program. The call client software program performs several functions such as displaying and running the user interface. The call client software also makes and submits requests to the call server 155. The call server 155 performs several tasks such as initiating and scheduling calls, transferring data, retrieving data from a database 170, and selecting a call center 115 from a number of available call centers.

Preferably, the Web site 160 accesses database 170 having a business directory. Entries in the business directory have a phone icon to initiate a call to the business selected. To initiate a call, a user selects the phone icon by providing an input to the computer system 135 using an input device, such as a mouse, keyboard, or remote control.

Selecting the phone icon will cause call request data, i.e. information relating to the customer and business, to be transmitted to the Web site providing the display. The call request data is then transmitted over the Internet 130 to a call center 115. The call center 115 then establishes a connection to the customer 120 and business 145 over a Public Switched Telephone Network ("PSTN") 150. The call center 115 initiates the call as a conference call, with itself as the silent party connecting the customer 120 and the business 145. Although only one call center is shown, in a preferred embodiment, multiple, geographically separate call centers are provided, and the call server 155 determines which is the most appropriate call center (such as the one with the cheapest phone rate for the call), and the call request data is sent to that call center.

The business directory preferably has an associated map database to provide directions to the business. The map database has longitude and latitude coordinates which can be used, in combination with a calling rates database, to determine the location of a call center 115 with the lowest calling rate available for the particular call.

A database associated with the Web site 160 will also contain billing information such as business address, contact person, and telephone number, with the business directory database. Since the business directory already is set up to bill the businesses for the business directory listings, it is adaptable to be used like an 800 service, to bill the business for the telephone call instead of the user. The user's phone number can be obtained by the user entering it at the time of the call, or from a user template previously established.

The user may also send a fax to a particular business location. Sending a fax can be accomplished in a manner similar to that described above. For example, a fax can be sent from a user at computer system 135 to a business fax machine 140 or any other device that can receive a fax. The user accesses the Web site 160 and clicks on the fax icon. The Web site 160 then prompts the user for the fax information, i.e., To, From, Date, Time, and Message, to be sent. A cover page with a Web service ID, a business ID, and a user ID is created by the call server 155 and is attached to the fax information. The Web service ID identifies the type of business, such as real estate. The business ID is usually a unique number that identifies the business and is usually the business' fax number. The user ID is typically the Zip2 user ID number. The call server 155 determines the most appropriate call center to utilize and the fax is then sent to the business fax machine 140 via the call center 115 and the PSTN 150. Once the business receives the fax, the business can reply to the fax by sending the cover sheet back to the user along with the additional pages of information from the business. The reply fax is sent via the PSTN 150, the call center 115, and the Internet 130. The call server 155 then creates an e-mail message to the user from the user ID informing the user that a fax is waiting. The call server 155 also creates an URL address so that the user can link up to the additional pages of information that were sent by the business. The URL address is created from the Web service ID, the business ID, and the user ID. The user can then click on the URL address to link up to the additional pages that were sent in the reply.

The user may also send a page to a particular business location. There are two different types of pages that can be sent. A numeric page and an alphanumeric page. For a numeric page, the step involved in sending the page from computer system 135 to pager 105 are similar to the steps described above. For example, a numeric pager number is input into computer system 135 and the call server 155 selects the most appropriate call center and sends the numeric number to the pager 105 via the PSTN 150. For an alphanumeric page, the call center 115 is typically not utilized. Rather, the alphanumeric page is transferred over the Internet 130 via an e-mail system. A pager provider, such as Metrocall, provides an e-mail to pager gateway which enables an e-mail message to be sent to pager 105. The e-mail system receives the alphanumeric page, i.e., the mail, and then transmits the mail over to the pager provider. The pager provider converts the e-mail message into a pager format and then pages the individual with the message. The e-mail system uses standard phone lines to transmit the e-mail message.

Figure 2:
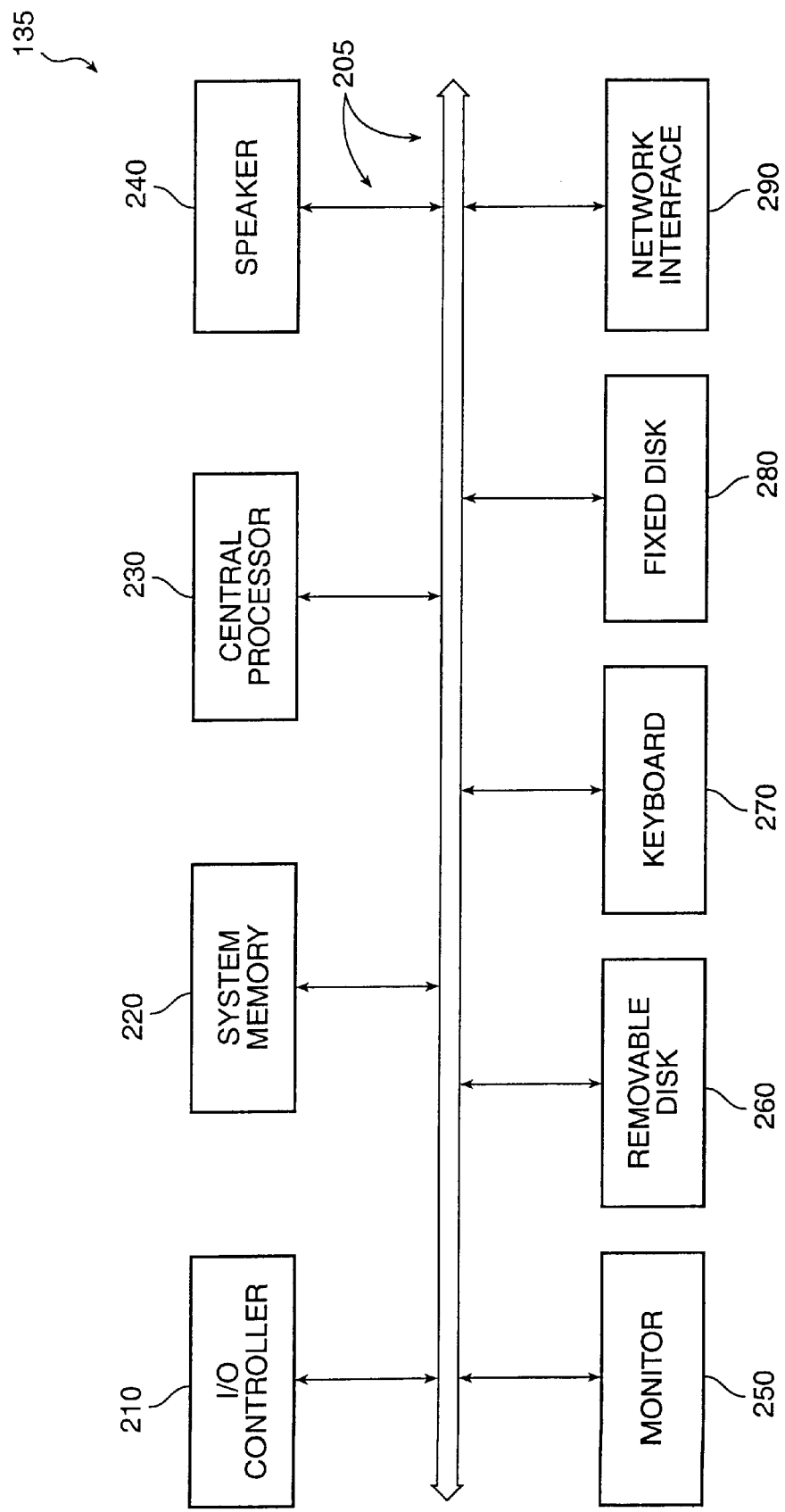
FIG. 2 illustrates a system block diagram of a typical computer system used to execute the software of an embodiment of the present invention.

FIG. 2 illustrates a system block diagram of a typical computer system 135 used to execute the software of an embodiment of the present invention. As shown in FIG. 2, computer system 135 includes speaker 240, monitor 250, and keyboard 270. Computer system 135 further includes subsystems such as I/O controller 210, system memory 220, central processor 230, removable disk 260 (e.g., CD-ROM drive), fixed disk 280 (e.g., hard drive), and network interface 290. Other computer systems suitable for use with the present invention may include additional or fewer subsystems.

Arrows such as 205 represent the systems bus architecture of computer system 135. These arrows illustrate the interconnection scheme used to link together the subsystems. For example, a local bus could be utilized to connect the central processor 230 to the keyboard 270. Computer system 135 shown in FIG. 1 is one example of a system suitable for use with the present invention. A television set and a terminal are other examples of systems suitable for use with the present invention. Also, other configurations of subsystems suitable for use with the present invention will be readily apparent to one of ordinary skill in the art.

Figure 3:
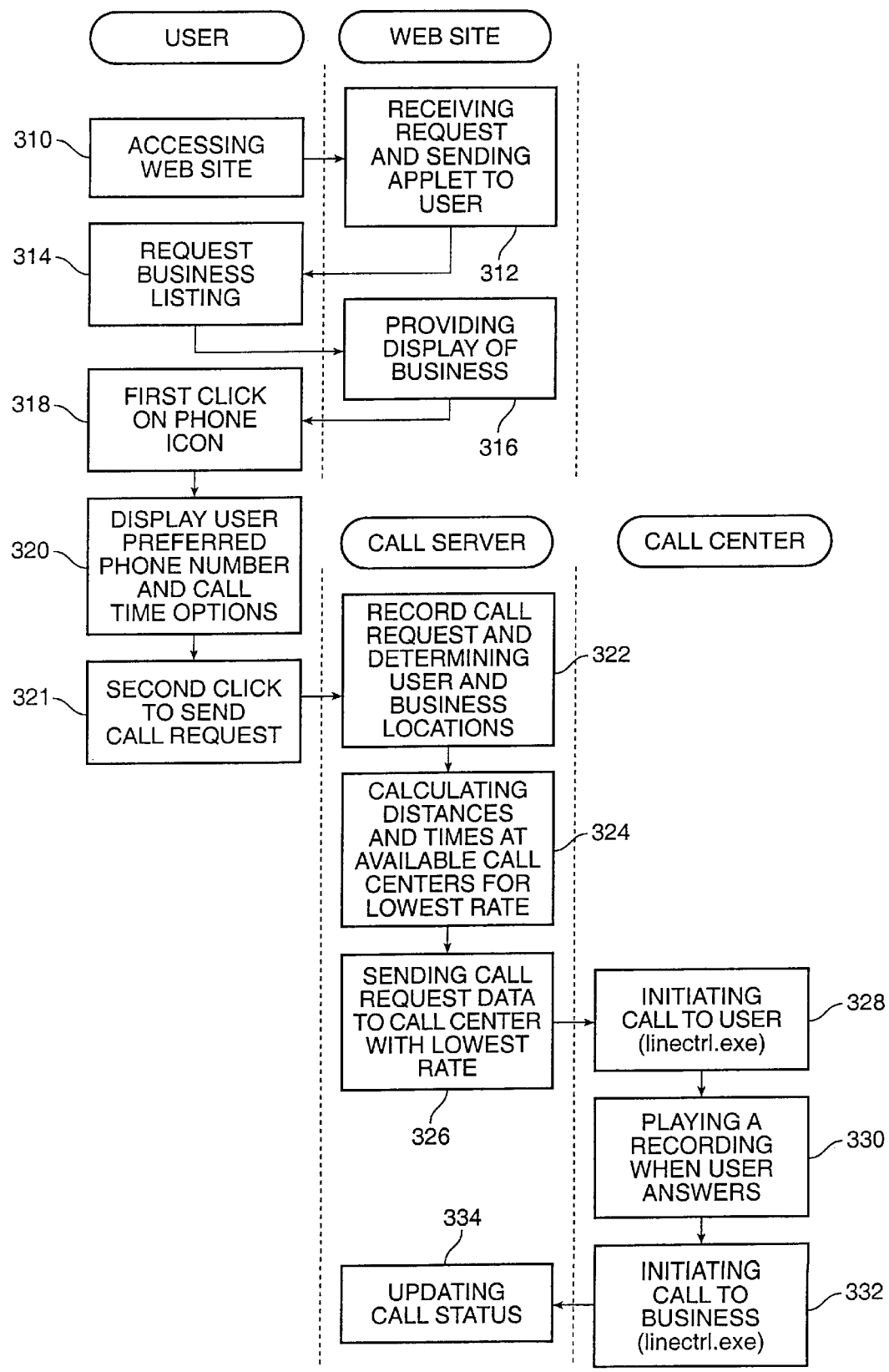
FIG. 3 illustrates a high level flowchart of a method of placing a call according to an embodiment of the present invention.

FIG. 3 illustrates a high level flowchart of a method of initiating a call. At step 310, a user's browser sends a request to access a Web site, such as the Zip2 Web site, through the Internet. The Web site is usually hosted in one location, however the call centers can be scattered throughout the United States to reduce the cost of calls. For example, a Web site located in Palo Alto can utilize a New York call center. At step 312, the Web site receives the user's request for information and sends an applet to the user.

At step 314, the user requests a business directory or a business entry from a directory. The Web site receives the request and provides the display to the user (step 316).

At step 318, the user does a first click on the phone icon to call the business and the user. The user's registered preferred phone number is displayed (step 320), allowing the user to confirm that number or enter a different number.

In one embodiment, if the user is not registered, an error message will appear on the display screen. The user will be prompted to select a desired time to make the phone call. This feature is useful where a user has only one phone line, and needs time to logoff before accepting a call. In one embodiment, times of immediately, or in 1, 2, 5, 10 or 15 minutes are provided as options. After the user selects a time to call, the user is prompted to confirm the phone call by making a second click on the phone icon.

Upon a second click (step 321), the call request data is sent to the call server. At step 322, the call data is recorded and the user and business locations are determined by accessing a map database. The map database has longitude and latitude coordinates which can be used, in combination with a calling rates database, to determine the distances from each call center to the user and business and times at each call center to determine the call center with the lowest calling rate available for the particular call at step 324.

For example, if the user is in California, and is calling someone in Idaho, it might actually be cheaper to use a call center in New York if evening calling rates are available in New York, while daytime rates are in effect in California and Idaho. In another example, a call center might be located centrally between the business and the user, such that a call from the user directly to the business would be at long distance rates, but two shorter calls from the call center to the business, and from the call center to the user, might each be at local rates.

The call request data is sent from the call server to the call center with the lowest calling rate at step 326. If the call is accepted immediately, i.e., there were phone lines available, the call center will be contacted and the call request data will be transferred to the call center. Otherwise, a background thread, called a call scheduler, constantly monitors queues of call requests for pending calls and available phone lines, will contact the call center when the phone lines are available. Typically, the call request data will be sent to the call center with the lowest calling rate, but if it is busy, the data may be sent to the first available center.

The call center initiates, through the PSTN, a phone call to the user at step 328. A linectrl.exe routine executes the call. If the user's telephone line is busy, the phone call will be retried. Typically, a phone call is repeated every 5 minutes if a connection is not established. If the user connection is successful, a recording is played to the user. Typically, the recording contains a please wait message. After the user greeting, the call center initiates, through the PSTN, a phone call to the business, at step 332. If the business' telephone line is busy, the phone call will be retried. Typically, a phone call is repeated every 5 minutes if a connection is not established. If the business connection is successful, in one embodiment, a please wait recording is played to the business while the user is connected, such as by taking the user off hold to initiate the conference call feature. If after 1 hour, both connections have not been established, the initiation of the calls will be terminated.

After the call has been completed or if the call was unsuccessful, the call center will contact the call server with the call status at step 334. Thereafter, a call listener routine waits for connections to call centers before updating the queues. If no lines are available or if the call was unsuccessful, the call scheduler will attempt a retry within 5 minutes. Typically, after 3 retries or if the call scheduler has not received the status on the call within an hour, the call scheduler will send an e-mail message to the user indicating that the user should try again later.

Although steps 310 through 334 are shown in a particular order, it is not required that these steps be performed in the order shown. Thus, the order shown in the flowchart is to illustrate one embodiment and not to limit the invention.

In a preferred embodiment, call server 155 runs a program called server.dll, which is a multi-threaded application that communicates via the Internet with multiple Call Centers, which are PCs loaded with Dialogic telephony cards, phone lines to Centrex services, and running callcenter.exe and linectrl.exe applications.

A business directory provided to a user allows the user to obtain more information about a listed business by accessing a Business Details page. The callclient.dll will be referenced by a call button (phone icon) on a Business Details page. A routine call search.dll, which creates these pages, will be responsible for only activating this button for businesses that have registered for this service and for passing on the business ID, business name, and user ID to the callclient.dll. The callclient.dll will query the Business database for the business' phone number and the User database for the user's phone number.

After the call has completed or if the call was unsuccessful, the Call Center will contact the callserver.dll with the call status. Another background thread, the call listener, waits on a TCP/IP socket for connections from Call Centers and when connected, updates the queues. If no lines are available or if the call was unsuccessful, the call scheduler will attempt a retry within five minutes. After three retries or if the call scheduler has not received status on a call within an hour, it will send an e-mail message to the user indicating that they should try again later.

The callclient.dll, callserver.dll, and the callcenter.exe's will communicate via TCP/IP connections, over the Internet. A callcenter.exe will contact the callserver.dll when it starts, register, and provide the status of its phone lines. Since the Zip2 Web Server can be stopped and started frequently and at any time, the callserver.dll may also contact each registered callcenter.exe when it is started. The callserver.dll will create and maintain its own persistent database of Call centers, Outbound Requests, and Inbound Requests.

The callcenters records have information like TCP/IP address, number of phone lines, etc. The Outbound Requests records have information like IDs, phone numbers, state of the call, etc. To ensure that pending calls are not lost when the Zip2 Web Server is restarted, the Outbound Requests records are queried for pending calls when the callserver.dll is started.

The callserver.dll routine creates and maintains its own call center database of call centers. The recording of the call center information protects this data from being lost in the event that the connection from the Web site to the Web server is lost.

Figure 4:
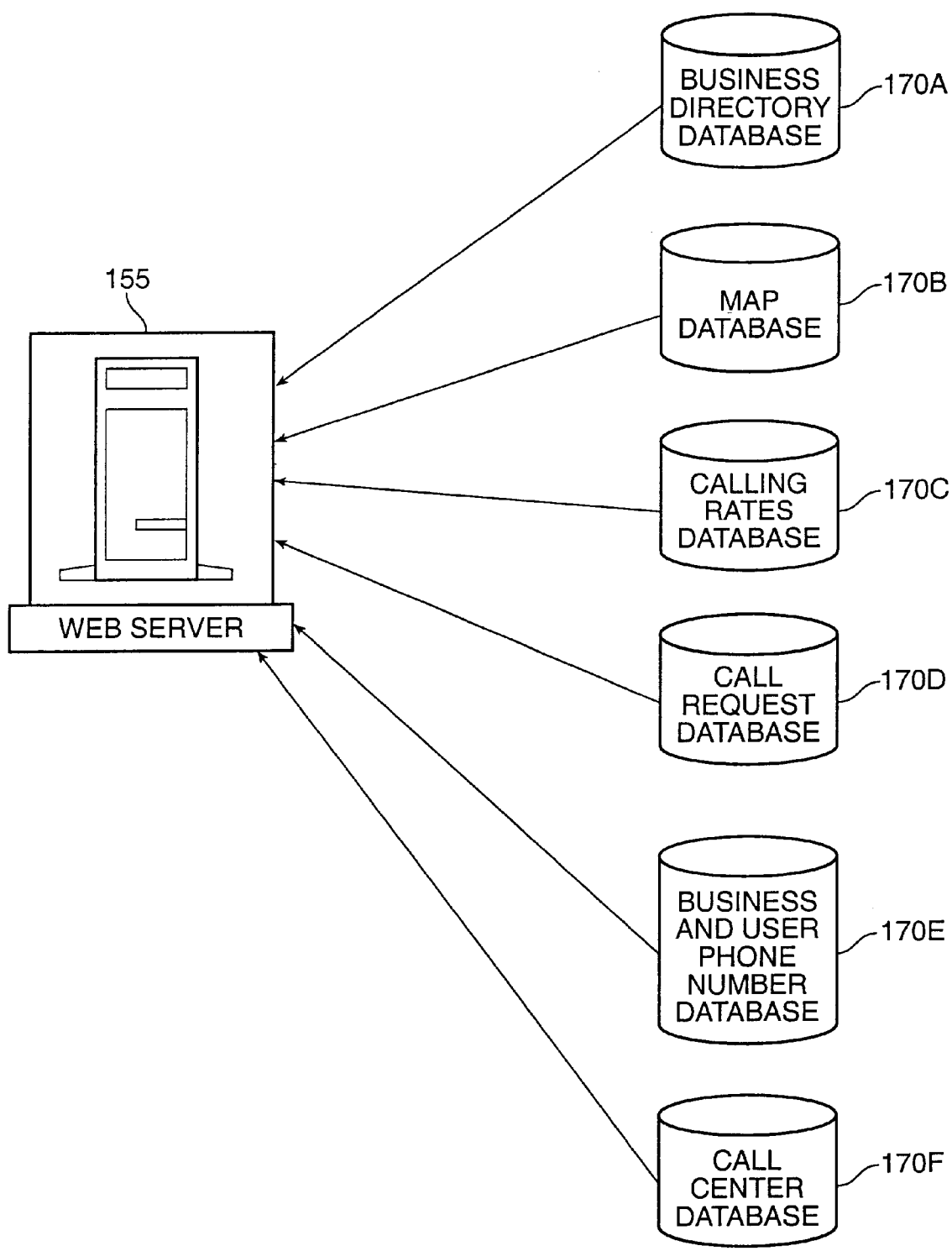
FIG. 4 illustrates a block diagram of one embodiment of the invention which utilizes several databases which communicate with the Web server.

FIG. 4 illustrates a block diagram of one embodiment of the invention which utilizes several databases which communicate with the Web server. The Web server 155 communicates and retrieves information from several different databases. Typically, the Web server 155 communicates with a business directory database 170A, map database 170B, calling rates database 170C, call request storage 170D, business and user phone number database 170E, and a call center database 170F.

The invention has now been explained with reference to specific embodiments. Other embodiments will be apparent to one of ordinary skill in the art. It is therefore not intended that this invention be limited, except as indicated by the appended claims.

What is claimed is:

1. A method of generating a telephone call, comprising:
   receiving, from a Web site, call request data requesting a telephone call between a user and a destination;
   selecting, from a plurality of geographically separate call centers, a call center having a lowest phone rate for the call request data by:

providing a map database;

determining latitude and longitude coordinates of the destination of said telephone call from the map database;

comparing the latitude and longitude coordinates to locations of the plurality of geographically separate call centers; and comparing a call time for the plurality of geographically separate call centers to a call time charge database;

transmitting the call request data to the call center; and initiating the telephone call from the call center using a Public Switched Telephone Network.

2. The method as recited in claim 1 wherein selecting the call center having the lowest phone rate further comprises:

calculating distance from the plurality of geographically separate call centers to the destination of the telephone call; and calculating distance from the plurality of geographically separate call centers to the user.

3. The method as recited in claim 1 wherein selecting the call center having the lowest phone rate further comprises:

calculating the time zone of the plurality of geographically separate call centers;

calculating the time zone of the destination of the telephone call; and calculating the time zone of the user.

4. A method of establishing a telephone call, comprising:

establishing a connection from a Web browser to a Web server through the Internet;

accessing a Web site from said Web browser;

transmitting data in the form of a Web page from said Web server to said Web browser;

selecting a phone icon on said Web page with a user input device;

sending a call request data identifying a user phone number and a party to be called from said Web browser to said Web server;

determining an appropriate call center from said call request data wherein said appropriate call center has a lowest calling rate for said call request;

sending a call center call request from said Web server to said appropriate call center;

initiating a call over a public switched telephone network to said user phone number from said appropriate call center;

playing a recorded message to said user; and initiating a call over said public switched telephone network to said party to be called from said appropriate call center.

5. The method as recited in claim 4 further comprising:

determining user and party to be called locations from a map database; and calculating distances and times for a plurality of call centers for determining a call center with the lowest calling rate.

6. The method as recited in claim 4 wherein initiating a call to said user is repeated after a selected period of time if a connection is not established.

7. The method as recited in claim 4 wherein initiating a call to said party to be called is repeated after a selected period of time if a connection is not established.

8. A system comprising:

a computer network;

a service provider server configured to connect to said computer network;

a user access device configured to connect to said computer network; and a plurality of call centers configured to connect to said computer network and to a public switched telephone network;

said service provider server being configured to accept call request data from said user access device over said computer network, select an appropriate call center from said plurality of call centers based on said call request data, and transmit a call request to said appropriate call center over said computer network;

said appropriate call center being configured to accept call requested data over said computer network from said service provider server and initiate conference calls to said user access device and a designated party to be called over said public switched telephone network.

9. A computer-implemented method of establishing a communication connection between a first party and a second party using a public switched telephone network (PSTN) and a communication network, the method comprising:

receiving a call request from the first party via the communication network to establish a communication connection between the first party and the second party;

determining geographical locations of the first party and the second party;

determining a call center, from a plurality of call centers, based on the geographical locations of the first party and the second party;

forwarding the call request to the call center; and initiating a conference call from the call center between the call center, the first party, and the second party using a PSTN such that the communication connection between the first party and the second party is established.

10. The method of claim 9 wherein determining the geographical locations of the first party and the second party comprises:

providing a first database storing latitude and longitude information; and determining latitude and longitude information from the first database for the first party and the second party.

11. The method of claim 9 wherein determining the call center based on the geographical locations of the first party and the second party comprises:

determining call rates for the plurality of call centers for establishing the communication connection between the first party and the second party; and selecting the call center which provides a lowest call rate for establishing the communication connection between the first party and the second party.

12. The method of claim 11 wherein determining the call rates for the plurality of call centers comprises:

receiving a time when the communication connection between the first party and the second party is to be established;

determining the call rates for the plurality of call centers based on the locations of the first party and the second party and the time when the communication connection between the first party and the second party is to be established.

13. The method of claim 11 wherein determining the call rates for the plurality of call centers comprises:

providing a second database storing call rates information;

determining the call rates for the plurality of call centers based on the locations of the first party and the second party and the call rates information stored in the second database.

14. The method of claim 9:
wherein receiving the call request from the first party comprises:
   receiving a time when the communication connection between the first party and the second party is to be established; and
wherein initiating the conference call comprises:
   initiating the conference call at the time indicated in the call request.

15. The method of claim 9 wherein initiating the conference call comprises:
   establishing a communication connection between the call center and the first party via the PSTN; and
   conferencing the second party in the communication connection.

16. The method of claim 9 wherein the call center is a silent party in the conference call established between the call center, the first party, and the second party.

17. The method of claim 9 further comprising:
   faxing a document from the first party to the second party via the communication connection established between the first party and the second party.

18. The method of claim 9 wherein receiving the call request from the first party comprises:
   providing a directory listing of a plurality of parties including the second party, the directory listing storing information for establishing communication connections with the plurality of parties; and
   receiving a signal from the first party indicating selection of the second party from the directory listing.

19. A computer program product embodied on a computer-readable storage medium for establishing a communication connection between a first party and a second party using a PSTN and a communication network, the computer program product comprising:
   code for receiving a call request from the first party via the communication network to establish a communication connection between the first party and the second party;
   code for determining geographical locations of the first party and the second party;
   code for determining a call center, from a plurality of call centers, based on the geographical locations of the first party and the second party;
   code for forwarding the call request to the call center; and
   code for initiating a conference call from the call center between the call center, the first party, and the second party using a PSTN such that a communication connection between the first party and the second party is established.

20. A communication system comprising:
   a communication network;
   a public switched telephone network (PSTN);
   a first server coupled to the communication network; and
   a plurality of call centers coupled to the communication network and to the PSTN;
   wherein the first server is configured to receive a call request from a first party via the communication network to establish a communication connection between the first party and a second party;
   wherein the first server is further configured to determine geographical locations of the first party and the second party, to determine a call center from the plurality of call centers based on the geographical locations of the first party and the second party, and to forward the call request to the call center; and
   wherein the call center is configured to initiate a conference call from the call center between the call center, the first party, and the second party using the PSTN such that the communication connection between the first party and the second party is established.

21. The system of claim 20 wherein to determine the geographical locations of the first party and the second party, the first server is configured to access a first database storing latitude and longitude information, and to determine latitude and longitude information from the first database for the first party and the second party.

22. The system of claim 20 wherein to determine the call center based on the geographical locations of the first party and the second party, the first server is configured to determine call rates for the plurality of call centers for establishing the communication connection between the first party and the second party, and to select the call center which provides a lowest call rate for establishing the communication connection between the first party and the second party.

23. The system of claim 22 wherein to determine the call rates for the plurality of call centers, the first server is configured to receive a time when the communication connection between the first party and the second party is to be established, and to determine the call rates for the plurality of call centers based on the locations of the first party and the second party and the time when the communication connection between the first party and the second party is to be established.

24. The system of claim 22 wherein to determine the call rates for the plurality of call centers, the first server is configured to access a second database storing call rates information, and to determine the call rates for the plurality of call centers based on the locations of the first party and the second party and the call rates information stored in the second database.

25. The system of claim 20:
   wherein to receive the call request from the first party, the first server is configured to receive a time when the communication connection between the first party and the second party is to be established; and
   wherein to initiate the conference call, the call center is configured to initiate the conference call at the time indicated in the call request.

26. The system of claim 20 wherein to initiate the conference call, the call center is configured to establish a communication connection between the call center and the first party via the PSTN, and to conference the second party in the communication connection.

27. The system of claim 20 wherein the call center is a silent party in the conference call established between the call center, the first party, and the second party.

28. The system of claim 20 wherein the call center is further configured to communicate a fax document from the first party to the second party via the communication connection established between the first party and the second party.

29. The system of claim 20 wherein to receive the call request from the first party, the first server is configured to provide a directory listing of a plurality of parties including the second party, the directory listing storing information for establishing communication connections with the plurality of parties, and to receive a signal from the first party indicating selection of the second party from the directory listing.

* * * * *